United States Patent
Cadima

(10) Patent No.: US 12,117,855 B2
(45) Date of Patent: Oct. 15, 2024

(54) OVEN DRAWER HAVING USER CONFIGURABLE HORIZONTALLY DIVIDED CAVITIES

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 425 days.

(21) Appl. No.: 17/503,431

(22) Filed: Oct. 18, 2021

(65) Prior Publication Data

US 2023/0120687 A1    Apr. 20, 2023

(51) Int. Cl.
*A47J 27/13*    (2006.01)
*F24C 15/16*    (2006.01)
*G05D 23/19*    (2006.01)

(52) U.S. Cl.
CPC .......... *G05D 23/1934* (2013.01); *A47J 27/13* (2013.01); *F24C 15/16* (2013.01); *A47J 2202/00* (2013.01)

(58) Field of Classification Search
CPC ........ F24C 15/166; F24C 15/18; F24C 15/16; F24C 7/085; A47J 27/13; G05D 23/19347; G05D 23/1934
See application file for complete search history.

(56) References Cited

U.S. PATENT DOCUMENTS

| | | | | |
|---|---|---|---|---|
| 1,961,332 A | * | 6/1934 | Burch | F24C 15/16 312/319.1 |
| 2,290,572 A | * | 7/1942 | Rakov | F24C 15/18 126/41 R |
| 4,436,215 A | * | 3/1984 | Kleinert | A47B 88/975 312/263 |
| 4,637,303 A | * | 1/1987 | Lucky | A47J 47/14 269/305 |
| 6,166,353 A | * | 12/2000 | Senneville | F24C 15/08 312/270.3 |
| 6,191,391 B1 | * | 2/2001 | Deo | F24C 15/18 219/407 |
| 7,038,175 B2 | | 5/2006 | Henninger et al. | |
| 2005/0274712 A1 | * | 12/2005 | Gagas | F24C 7/087 219/385 |

(Continued)

FOREIGN PATENT DOCUMENTS

| | | | | |
|---|---|---|---|---|
| CA | | 2837364 A1 * | 6/2015 | F24C 15/18 |
| CN | | 101336354 B | 12/2008 | |

(Continued)

*Primary Examiner* — Alfred Basichas
(74) *Attorney, Agent, or Firm* — Dority & Manning, P.A.

(57) ABSTRACT

An oven appliance includes a cooking chamber positioned within a cabinet, a heating assembly defining a plurality of heating zones, and a drawer assembly slidably positioned within the cooking chamber. The drawer assembly includes a drawer frame slidably mounted to sidewalls of the cooking chamber, a horizontal rack mounted proximate a bottom of the drawer frame, and one or more vertical dividers positionable within the drawer frame to define a plurality of cooking chambers, each of the plurality of cooking chambers being aligned with one or more of the plurality of heating zones.

18 Claims, 8 Drawing Sheets

(56) References Cited

U.S. PATENT DOCUMENTS

| | | | | |
|---|---|---|---|---|
| 2007/0158327 A1* | 7/2007 | Morrow | ............... | A47J 27/004 |
| | | | | 219/412 |
| 2013/0291854 A1* | 11/2013 | Johnson | ............... | F24C 15/322 |
| | | | | 126/21 A |
| 2021/0140645 A1* | 5/2021 | Greenwood | ........... | G06V 20/64 |

FOREIGN PATENT DOCUMENTS

| | | | | |
|---|---|---|---|---|
| DE | 102010029197 A1 * | 11/2011 | ............. | F24C 15/16 |
| DE | 102021202899 A1 * | 9/2022 | | |
| EP | 1806069 A1 | 7/2007 | | |
| EP | 2431667 A1 * | 3/2012 | ............ | F24C 15/166 |
| KR | 100730964 B1 * | 7/2006 | .............. | F24C 7/087 |

* cited by examiner

OVEN DRAWER HAVING USER CONFIGURABLE HORIZONTALLY DIVIDED CAVITIES

FIELD OF THE INVENTION

The present subject matter relates generally to oven appliances, and more particularly, to oven drawers having multiple cavities that may be independently regulated.

BACKGROUND OF THE INVENTION

Conventional residential and commercial oven appliances generally include a cabinet that includes a cooking chamber for receipt of food items for cooking. Multiple heating elements are positioned within the cooking chamber to provide heat to food items located therein. The heating elements can include, for example, radiant heating elements, such as a bake heating assembly positioned at a bottom of the cooking chamber and/or a separate broiler heating assembly positioned at a top of the cooking chamber.

Conventional oven appliances may include multiple oven cavities having independent heaters, e.g., to facilitate the use of a single appliance to cook different food items simultaneously and according to different cooking recipes (e.g., cooking times and target cooking temperatures). For example, certain conventional oven appliances include a cooking chamber with an upper heating element and a lower heating element. A horizontal divider is positioned within that cooking chamber to divide it into multiple oven cavities. However, the inclusion of such a horizontal divider creates two cavities that are only heated directly from the top or the bottom. Accordingly, the ability of either cavity to perform a cooking mode is limited to the location of its respective heater and the performance will be less than that of a cavity having control of a top and bottom heat. In this regard, for example, the lower level of a vertically divided cavity may be inadequate for heating foods that need top heating or browning effects, such as a frozen pizza. Alternatively, the upper cavity may have inadequate bottom heating, which may be desirable for many foods, such as frozen casseroles. Moreover, as heat is inclined to rise, the natural tendency of a vertically divided oven is for the lower oven to also affect the upper oven, reducing an independence of the cavities. Thus, food in the upper cavity will receive cooking energy regardless of the upper oven's operation if the lower cavity is operated at a high temperature.

Accordingly, an oven appliance that provides multiple cooking configurations would be useful. More particularly, an oven appliance that provides flexibility to divide a cooking chamber into multiple cavities while facilitating improved heating uniformity would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an oven appliance defining a vertical, a lateral, and a transverse direction is provided. The oven appliance includes a cooking chamber positioned within a cabinet, a heating assembly comprising a plurality of upper heating elements positioned proximate a top of the cooking chamber and a plurality of lower heating elements positioned proximate a bottom of the cooking chamber to define a plurality of heating zones, and a drawer assembly slidably positioned within the cooking chamber. The drawer assembly includes a drawer frame slidably mounted to sidewalls of the cooking chamber and being movable between an open position and a closed position, a horizontal rack mounted proximate a bottom of the drawer frame, and one or more vertical dividers positionable within the drawer frame to define a plurality of cooking chambers, each of the plurality of cooking chambers being aligned with one or more of the plurality of heating zones.

In another exemplary embodiment, a drawer assembly for an oven appliance is provided. The oven appliance includes a cooking chamber positioned within a cabinet and a heating assembly defining a plurality of heating zones. The drawer assembly includes a drawer frame slidably mounted to sidewalls of the cooking chamber and being movable between an open position and a closed position, a horizontal rack mounted proximate a bottom of the drawer frame, and one or more vertical dividers positionable within the drawer frame to define a plurality of cooking chambers, each of the plurality of cooking chambers being aligned with one or more of the plurality of heating zones.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
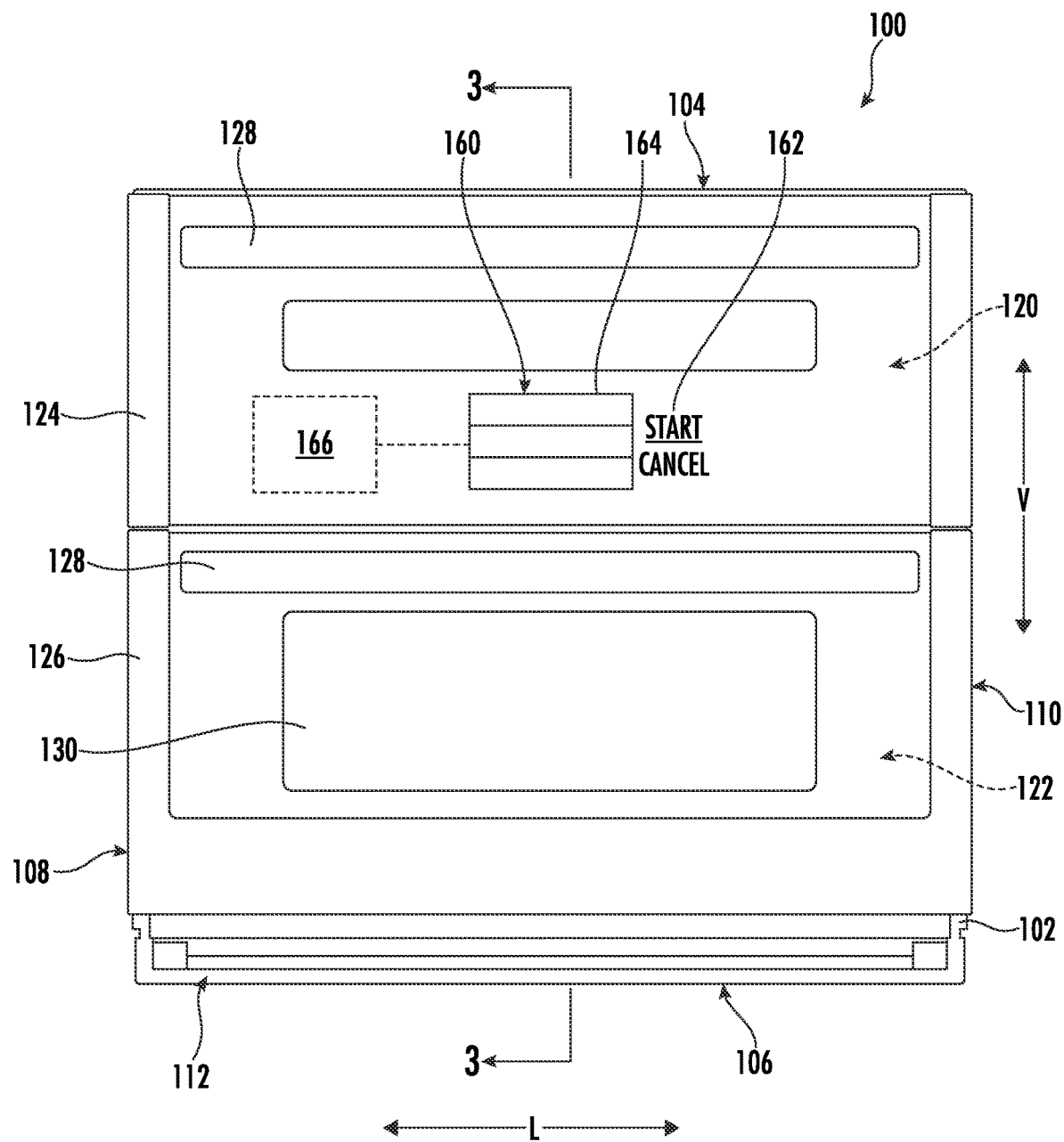
FIG. 1 is a front view of an oven appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of an oven appliance 100 as may be employed with the present subject matter. FIGS. 2 through 9 provides additional schematic views of oven appliance 100. Oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is an upper cooking chamber 120 and a lower cooking chamber 122 configured for the receipt of one or more food items to be cooked. Thus, oven appliance 100 is generally referred to as a double oven range appliance. However, as will be understood by those skilled in the art, oven appliance 100 is provided by way of example only, and the present subject matter may be used in any suitable cooking appliance. For example, although oven appliance 100 is illustrated as a wall oven that is installable within a bank of cabinets, it should be appreciated that aspects of the present subject matter may be used in other styles of oven appliances, such as free-standing oven appliances, double ovens, etc. In addition, the present subject matter may be used with oven appliances such as electric ovens, gas ovens, microwave ovens, etc. The example embodiment shown in FIG. 1 is not intended to limit the present subject matter to any particular cooking chamber configuration or arrangement.

Oven appliance 100 includes an upper door 124 that is slidably mounted to cabinet 102 (e.g., on a drawer assembly as described below) and a lower door 126 rotatably attached to cabinet 102 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Doors 124, 126 may include windows 130, constructed for example from multiple parallel glass panes to provide for viewing the contents of and insulating the insulated cooking chambers 120, 122.

Figure 2:
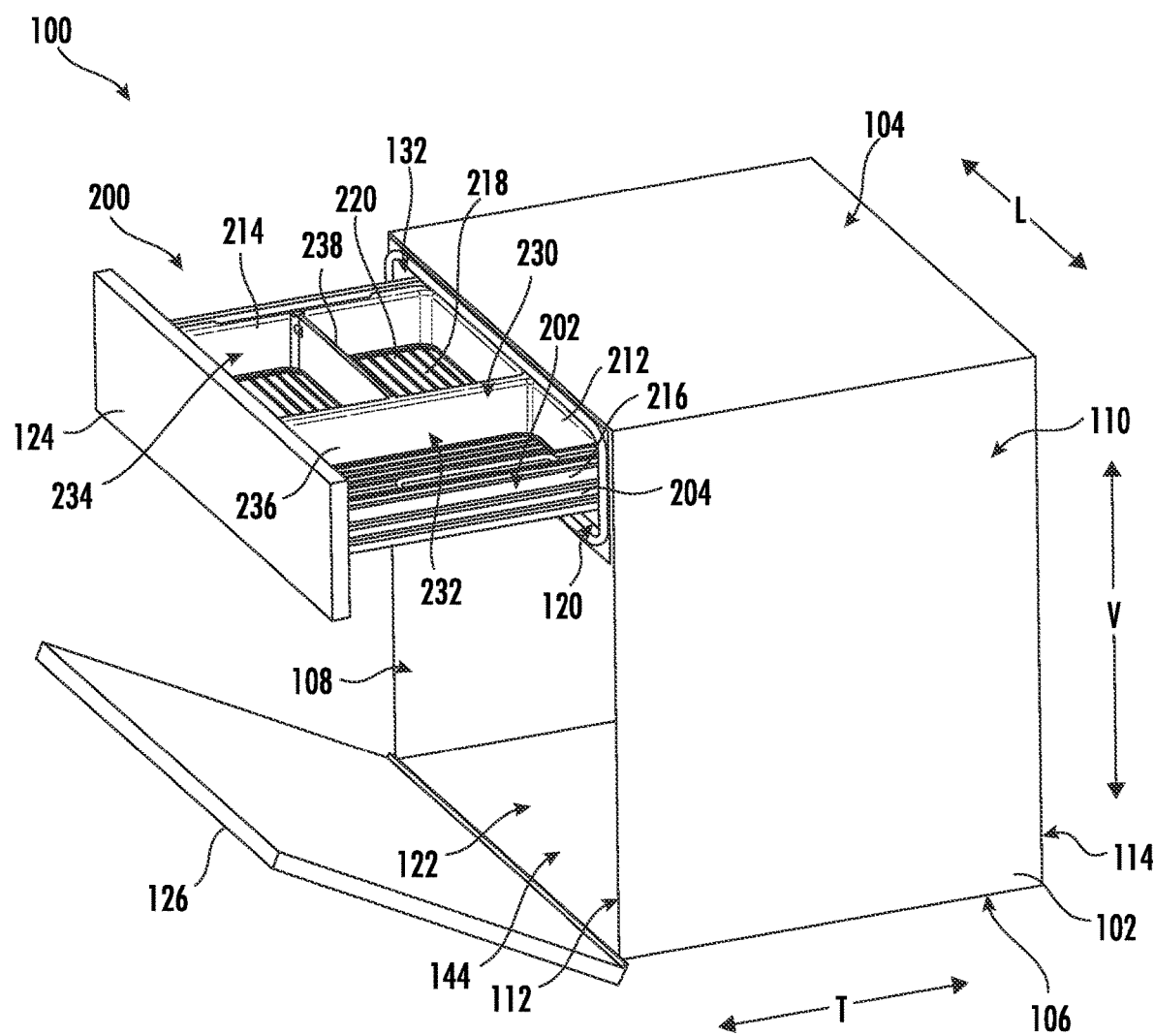
FIG. 2 is a schematic, perspective view of the exemplary oven appliance of FIG. 1 with the door and drawer assembly in an open positioned according to exemplary embodiments of the present subject matter.
Figure 3:
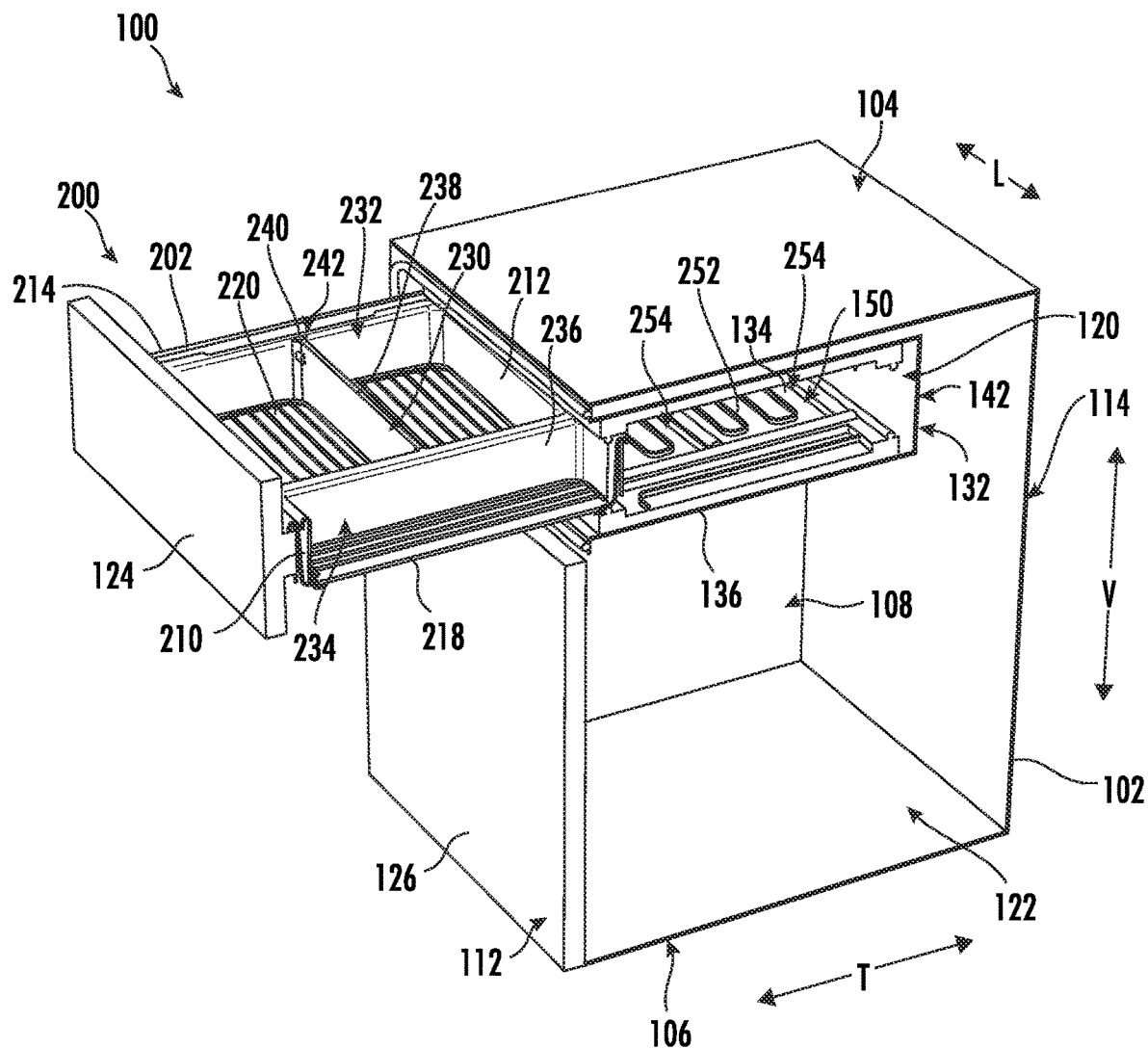
FIG. 3 is a schematic, cross-sectional view of the exemplary oven appliance of FIG. 1, taken along Line 3-3 of FIG. 1.
Figure 4:
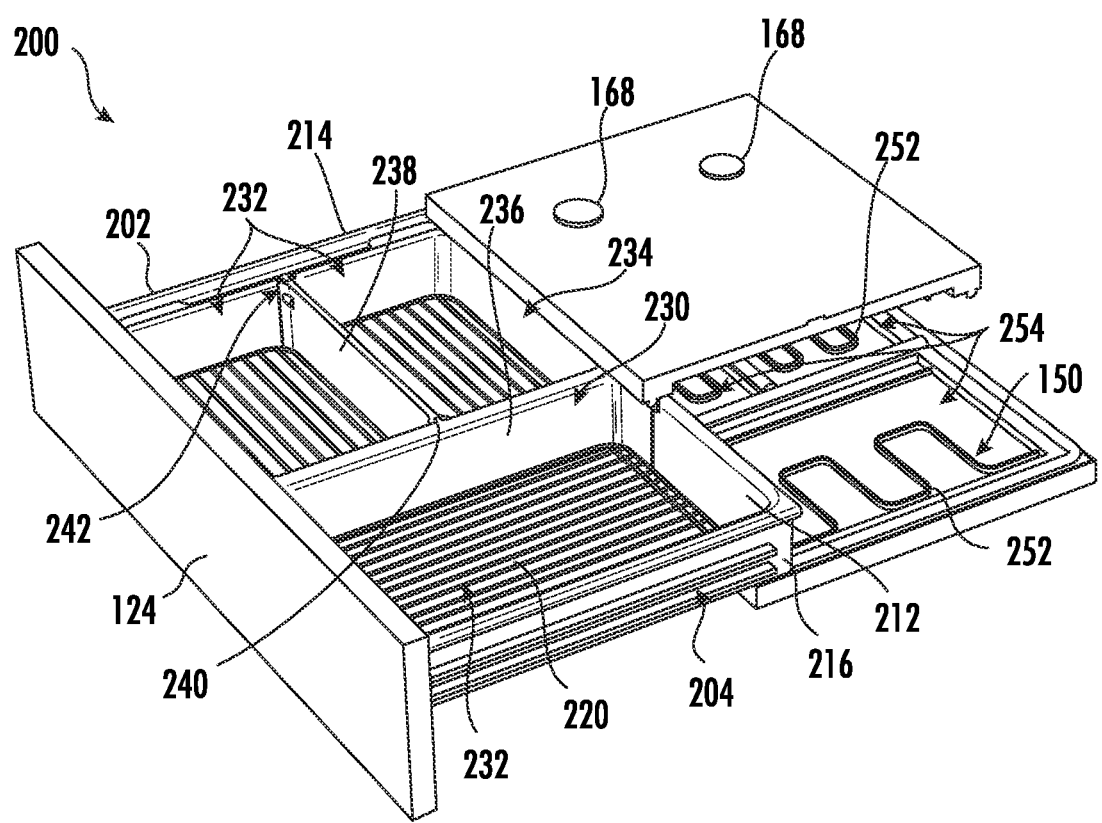
FIG. 4 is a partial perspective view of the exemplary drawer assembly of FIG. 2 according to an exemplary embodiment of the present subject matter.
Figure 5:
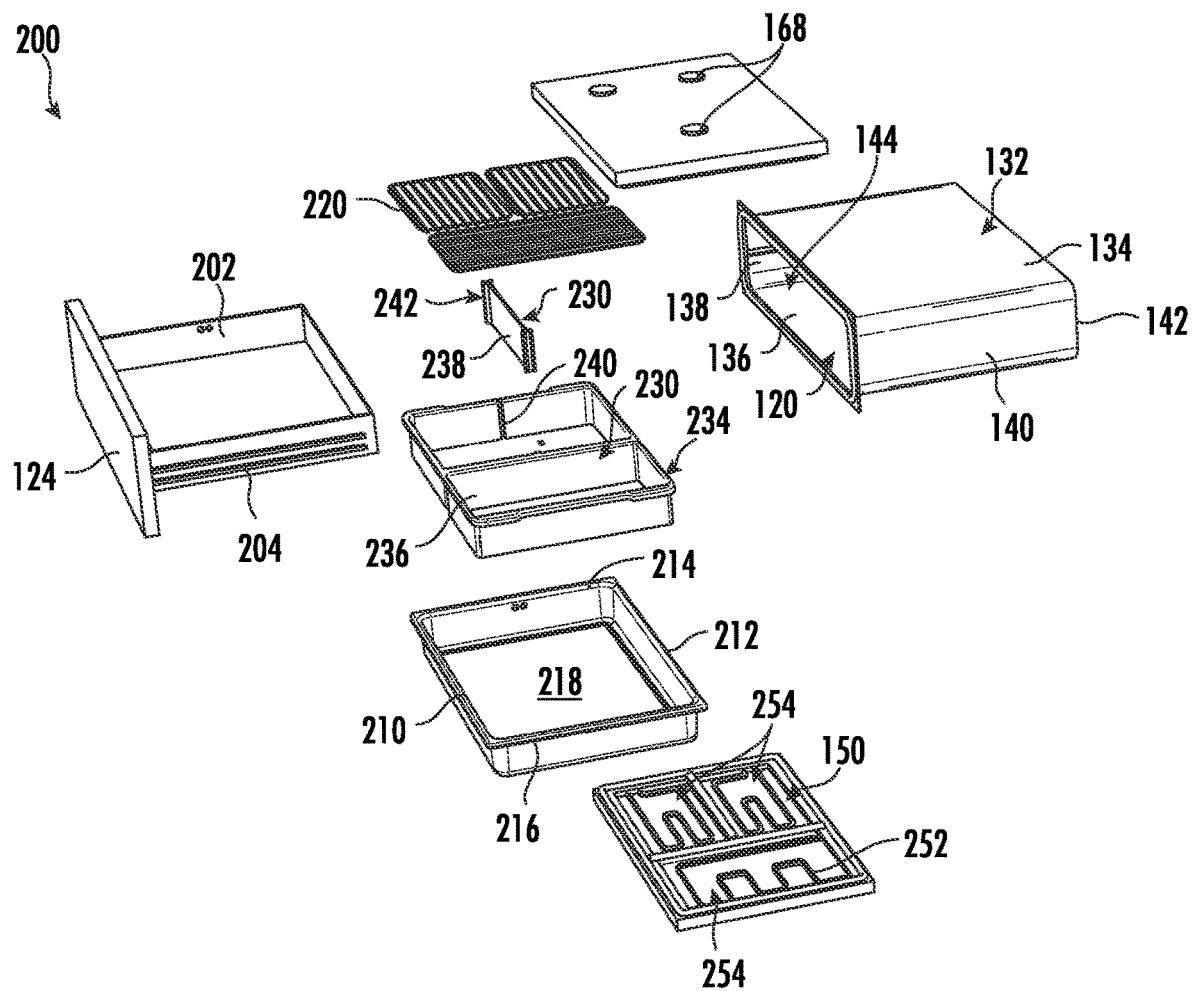
FIG. 5 is an exploded view of the exemplary drawer assembly of FIG. 2 according to an exemplary embodiment of the present subject matter.

As shown for example in FIG. 2, each of insulated cooking chambers 120, 122 are defined by a plurality of chamber walls, identified generally herein by reference numeral 132. For example, insulated cooking chambers 120, 122 each include a top wall 134 and a bottom wall 136 which are spaced apart along the vertical direction V. A left sidewall 138 and a right sidewall 140 extend between the top wall 134 and bottom wall 136, and are spaced apart along the lateral direction L. A rear wall 142 may additionally extend between the top wall 134 and the bottom wall 136 as well as between the left sidewall 138 and the right sidewall 140, and is spaced apart from doors 124, 126 along the transverse direction T. In this manner, when doors 124, 126 are in the closed position, cooking cavities are defined, and a front opening 144 is defined for each cooking chamber 120, 122, e.g., proximate front 112 of oven appliance 100.

Oven appliance 100 may include a plurality of racks (not shown) positioned within upper cooking chamber 120 and/or lower cooking chamber 122 for receiving food or cooking utensils containing food items. These cooking racks provide support for such food during a cooking process. According to the illustrated embodiment, the cooking racks may be slidably mounted within lower cooking chamber 122 by one or more slide assemblies (not shown) that are mounted to sidewalls 138, 140 of lower cooking chamber 122. Alternatively, the cooking racks may be slidably received onto embossed ribs or sliding rails such that the cooking racks may be conveniently moved into and out of lower cooking chamber 122.

Referring now generally to FIGS. 3 through 6, oven appliance 100 may include one or more heating elements or assemblies (identified generally by reference numeral 150) positioned within cabinet 102 or that may otherwise be in thermal communication with upper cooking chamber 120 and lower cooking chamber 122 for regulating the temperatures therein. For example, heating assemblies 150 may be electric resistance heating elements, gas burners, microwave heating elements, halogen heating elements, electric tubular heaters (e.g., such as Calrod® heaters), or suitable combinations thereof. Heating assemblies 150 are positioned in thermal communication with upper cooking chamber 120 and lower cooking chamber 122 for heating upper cooking chamber 120 and lower cooking chamber 122. Heating assemblies 150 will be described in more detail below.

A user interface panel 160 is located within convenient reach of a user of the oven appliance 100. For this example embodiment, user interface panel 160 includes user inputs 162 that may generally be configured for regulating heating assemblies 150 or operation of oven appliance 100. In this manner, user inputs 162 allow the user to activate each heating assembly 150 and determine the amount of heat input provided by each heating assembly 150 to cook food items within cooking chambers 120, 122. Although shown with user inputs 162, it should be understood that user inputs 162 and the configuration of oven appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating assembly 150 is activated and/or the rate at which the heating assembly 150 is set.

Generally, oven appliance 100 may include a controller 166 in operative communication with user interface panel 160. User interface panel 160 of oven appliance 100 may be in communication with controller 166 via, for example, one or more signal lines or shared communication busses, and signals generated in controller 166 operate oven appliance 100 in response to user input via user inputs 162. Input/Output ("I/O") signals may be routed between controller 166 and various operational components of oven appliance 100 such that operation of oven appliance 100 can be regulated by controller 166.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 166 may also be in communication with one or more sensors, such as temperature sensors 168 (FIG. 6), which may be used to measure temperatures inside cooking chambers 120, 122 and provide such measurements to the controller 166. It should be appreciated that other sensor types, positions, and configurations may be used according to alternative embodiments. As used herein, "temperature sensor" or the equivalent is intended to refer to any suitable type of temperature measuring system or device positioned at any suitable location for measuring the desired temperature. Thus, for example, temperature sensors 168 may each be any suitable type of temperature sensor, such as a thermistor, a thermocouple, a resistance temperature detector, a semiconductor-based integrated circuit temperature sensor, etc. In addition, temperature sensors 168 may be positioned at any suitable location and may output a signal, such as a voltage, to a controller that is proportional to and/or indicative of the temperature being measured. Although exemplary positioning of temperature sensors is described herein, it should be appreciated that oven appliance 100 may include any other suitable number, type, and position of temperature sensors according to alternative embodiments.

Referring now generally to FIGS. 1 through 9, a drawer assembly 200 that may be used with oven appliance 100 will be described according to exemplary embodiments of the present subject matter. In general, drawer assembly 200 is slidably mounted within a cooking chamber of oven appliance, e.g., illustrated herein as upper cooking chamber 120. However, it should be appreciated that drawer assembly 200 may be mounted within any other suitable oven appliance and cooking chamber. Moreover, as explained in more detail below, drawer assembly 200 may be user configurable with vertical dividers to define various cooking cavities. In addition, heating assembly 150 may include multiple independently operable heaters that are aligned with or otherwise correspond with one or more heating zones. These heating zones may be selectively operated to heat one or more cooking cavities within drawer assembly 200, as will be described in more detail below. It should be appreciated that the exemplary embodiments of heating assembly 150 and drawer assembly 200 provided below are only exemplary and are not intended to limit the scope present subject matter.

In general, drawer assembly 200 includes a drawer frame 202 that is slidably mounted to the sidewalls of a cooking chamber. For example, drawer frame 202 may be slidably mounted to the left sidewall 138 and right sidewall 140 of upper cooking chamber 120 using slide assemblies 204. In this manner, slide assemblies 204 permit a user to move drawer frame 202 between a closed position (e.g., as shown in FIG. 1) and an open position (e.g., as shown in FIG. 2). Specifically, upper door 124 may be mounted to a front end of drawer frame 202 such that a user may pull on handle 128 to slide drawer frame 202 toward the open position.

According to the illustrated embodiment, drawer frame 202 may generally extend between a front wall 210 and a back wall 212 along the transverse direction T and between a left wall 214 and a right wall 216 along the lateral direction L. In addition, drawer assembly 200 may include a ceramic glass panel 218 that is positioned within drawer frame 202 and generally defines a bottom of drawer frame 202. In general, ceramic glass panel 218 may serve to contain food spills and permit radiant heat from heating assembly 150 to pass through the bottom of drawer frame 202 for heating each respective cooking cavity. Walls 210-216 and glass panel 218 may generally define a primary chamber of drawer assembly 200 that corresponds to upper cooking chamber 120 when drawer frame 202 is in the closed position.

In addition, drawer assembly 200 may include one or more cooking racks that are mounted to drawer frame 202 or that are supported by ceramic glass panel 218 for receiving food items during a cooking process. For example, according to the illustrated embodiment, drawer 202 includes three horizontal cooking racks 220 that are mounted proximate a bottom of drawer frame 202 for supporting food items within three separate cooking zones (described below).

Notably, as explained above, it may be desirable to divide upper cooking chamber 120 into multiple independent heating zones. Accordingly, drawer assembly 200 may generally include one or more vertical dividers (e.g., identified generally by reference numeral 230) that are positionable within drawer frame 202 to divide upper cooking chamber 120 into a plurality of cavities or cooking chambers 232. In this regard, vertical dividers 230 may be removed or added by a user of oven appliance 100 to define any suitable number, size, and configuration of cooking chambers 232. Although the illustrated embodiment shows two vertical dividers 230 that may be positioned to define three cooking chambers 232 within drawer frame 202, it should be appreciated that aspects of the present subject matter may include any suitable number of dividers that are mounted within drawer frame 202 in any suitable manner.

According to the illustrated embodiment, vertical dividers 230 include a primary divider frame 234 that may be seated within drawer frame 202 to divide drawer frame 202 into two laterally spaced cooking chambers 232. More specifically, primary divider frame 234 includes a transverse divider 236 that extends along the transverse direction T from front wall 210 to rear wall 212 of drawer frame 202. Although transverse divider 236 is illustrated herein as being part of a primary divider frame 234 that is seated within drawer frame 202, it should be appreciated that transverse divider 236 may be a separate piece that is mounted directly to drawer frame 202 (e.g., similar to the lateral divider described below).

According to the illustrated embodiment, drawer assembly 200 may further include a lateral divider 238 that extends along the lateral direction L from a sidewall (e.g., left wall 214 or right wall 216) of drawer frame 202 to transverse divider 236. More specifically, as illustrated, primary divider frame 234 and a transverse divider 236 may define vertical slide rails 240 and lateral divider 238 may define complementary grooves 242 on each lateral end. In general, complementary grooves 242 are configured for receiving vertical slide rails 240 when lateral divider 238 is installed as part of drawer frame 202. It should be appreciated that a similar rail and groove construction may be used to mount transverse divider 236 to drawer frame 202 (e.g., independent of primary divider frame 234).

Although the illustrated embodiment shows primary divider frame 234 and lateral divider 238 that are positioned to define three cooking chambers 232, it should be appreciated that any other suitable number of dividers may be oriented and positioned in any suitable manner to define any number of cooking chambers 232. For example, according to alternative embodiment, the one or more vertical dividers 230 may include a lateral divider that extends along the lateral direction L between left wall 214 and right wall 216 of drawer frame 202 and a transverse divider that extends along the transverse direction T from a front wall 210 or rear wall 212 of drawer frame 202 to the lateral divider. In addition, it should be appreciated that the features for engaging the dividers within drawer frame 202 may vary. Other variations and modifications of drawer assembly 200 are possible and within the scope of the present subject matter.

It should be appreciated that vertical dividers 230 may generally be constructed from any suitably rigid and thermally insulating material or materials. For example, according to an exemplary embodiment, vertical dividers 230 may be a multi-wall steel divider. According to alternative embodiments, vertical dividers 230 may be insulated panels including encapsulated insulation or any other suitably rigid and thermally insulating material to reduce an interaction or thermal communication between adjacent cooking chambers 232.

Figure 6:
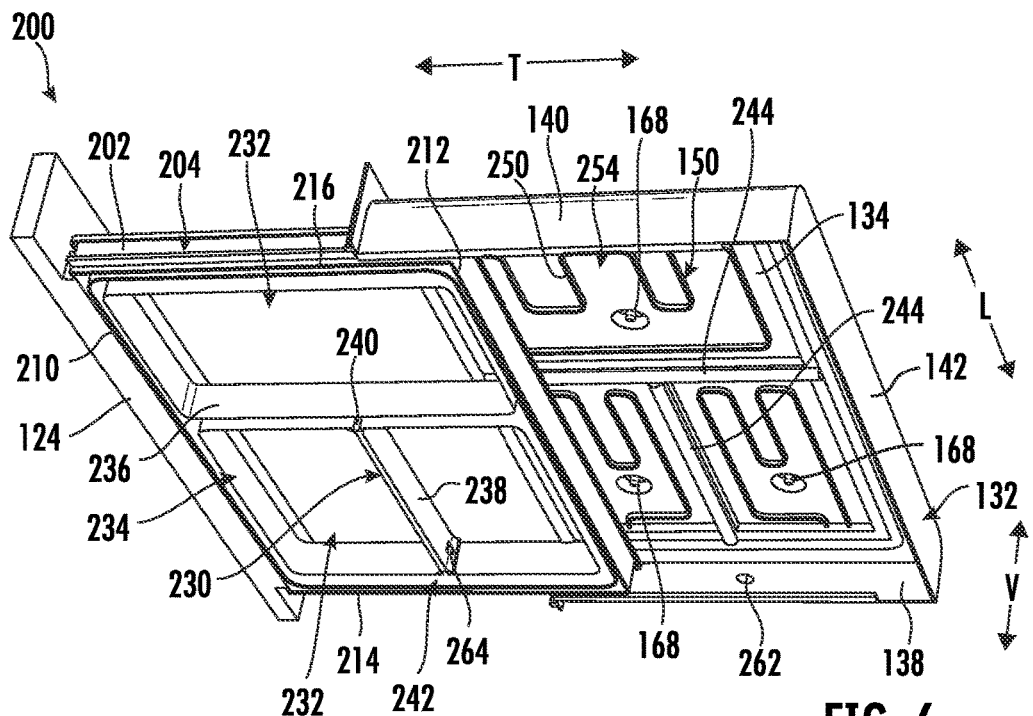
FIG. 6 is a bottom, perspective, cross-sectional view of the exemplary drawer assembly of FIG. 2 according to an exemplary embodiment of the present subject matter.

It should be appreciated that drawer assembly 200 may include additional features for providing suitable thermal isolation between cooking chambers 232. For example, as best shown in FIG. 6, drawer assembly 200 may include a plurality of gaskets 244 that are generally configured for engaging vertical dividers 230 to reduce or eliminate gaps through which air may pass between cooking chambers 232. For example, gaskets 244 may be positioned at any location where vertical dividers 230 may be positioned. For example, gaskets 244 may be mounted on the top and/or bottom of vertical dividers 230. According to the illustrated embodiment, gaskets 244 are mounted to top wall 134 of upper cooking chamber 120 such that gaskets 244 engage vertical dividers 230 when drawer assembly 200 is moved toward the closed position. Other suitable sealing mechanisms are possible and within scope the present subject matter.

Referring still generally to FIGS. 2 through 9, heating assembly 150 will be described in more detail according to exemplary embodiments of the present subject matter. In this regard, heating assembly 150 may generally include a plurality of upper heating elements (e.g., identified generally by reference numeral 250) that are positioned proximate a top of upper cooking chamber 120 (e.g., mounted on or within top wall 134 and which may be referred to as a broil heating element or gas burner). In addition, heating assembly 150 may generally include a plurality of lower heating elements (e.g., identified generally by reference numeral 252) that are positioned proximate a bottom of upper cooking chamber 120 (e.g., mounted on or within bottom wall 136 and which may be referred to as a bake heating element or gas burner).

According to exemplary embodiments, each of upper heating elements 250 and lower heating elements 252 may be operated independently of each other to facilitate heating of cooking chambers 232 of drawer assembly 200 when positioned in upper cooking chamber 120. Specifically, upper heating elements 250 and lower heating elements 252 may generally be positioned and configured to define a plurality of heating zones (e.g., identified generally by reference numeral 254). Each of these heating zones 254 may be aligned with or otherwise correspond with one or more cooking chambers 232 of drawer assembly 200. In this regard, according to the illustrated example, heating assembly 150 defines three heating zones 254 (e.g., a right heating zone, a left front heating zone, and a left rear heating zone).

In general, controller 166 of oven appliance 100 may be in operative communication with heating assembly 150 for independently or collectively operating upper heating elements 250 and lower heating elements 252 in any suitable manner to regulate the temperatures within heating zones 254. For example, if transverse divider 236 and lateral divider 238 are both installed such that three heating zones 254 are defined, controller 166 may prompt the user to input different cooking recipes (e.g., including cooking mode, cooking times, cooking durations, etc.) for each respective heating zone 254. Controller 166 may then operate heating assembly 150 to perform cooking processes in each cooking chamber 120 in accordance with their respective cooking recipes.

In addition, as best shown in FIG. 6, oven appliance 100 may include three temperature sensors 168, each being positioned within or otherwise in thermal communication with a specific heating zone 254. In this manner, controller 166 may use temperature sensors 168 to monitor the temperature within each respective heating zone 254 and may implement a closed-loop cooking process within each of those cooking chambers 232. In addition, it should be appreciated that temperature sensors 168 and heating assembly 150 may operate in unison in circumstances where one or more vertical dividers 230 are removed. For example, controller 166 may be configured to detect or determine when one or more vertical dividers have been removed from the drawer assembly 200. For example, if all vertical dividers 230 have been removed, all of the upper heating elements 250 and lower heating elements 252 may operate together to evenly heat the entire upper cooking chamber 120 based on feedback from all three temperature sensors 168.

Alternatively, controller 166 can be programmed to detect one or more configured zones of the cooking chambers 232, e.g., by detecting the presence and configuration of vertical dividers 230. Controller 166 may then operate a heating assembly 150 to independently regulate heating within each of the configured zones. In this regard, for example, if lateral divider 238 has been removed from the drawer frame 202, controller 166 may know that drawer assembly 200 has a two-chamber cooking configuration. Accordingly, the left rear heating zone 254 and the left front heating zone 254 may operate together to heat the left cooking chamber 232. In addition, if a smaller amount of food is being cooked, a single heating zone 254 may be activated while the remaining heating zones 254 remain off to conserve energy.

Figure 10:
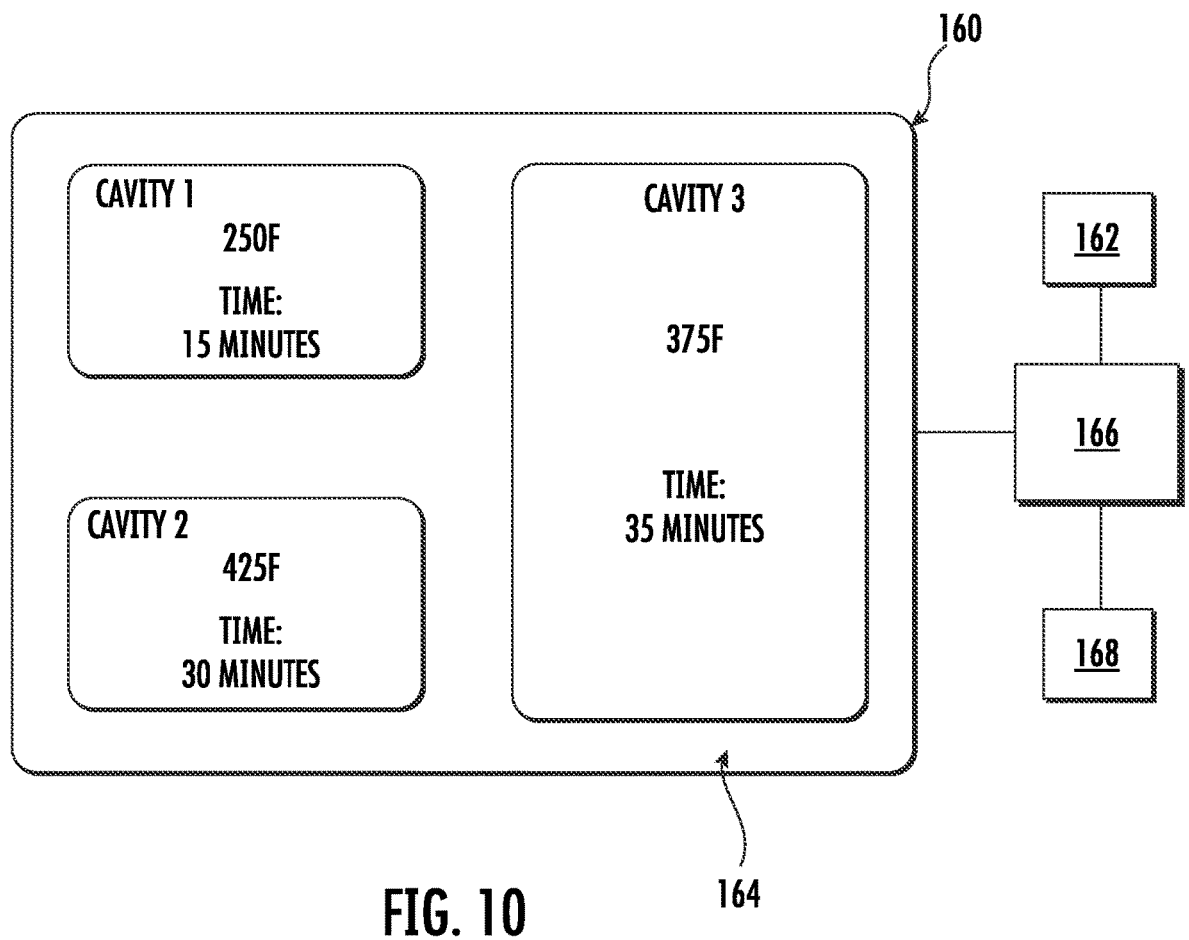
FIG. 10 is a schematic representation of a user interface panel of the exemplary oven appliance of FIG. 1 according to an exemplary embodiment of the present subject matter.

Referring now briefly to FIG. 10, controller 166 may be further configured to interact with user interface panel 160 to provide a visual display of the one or more configured zones on the user interface panel. For example, as shown in FIG. 10, controller 166 has detected that transverse divider 236 and lateral divider 238 have been installed to define three cooking chambers 232. Accordingly, controller 166 may use user interface panel 160 to prompt the user for the cooking recipes for each specific chamber. For example, controller 166 may use display 164 to provide a graphic or visual representation of the chamber configuration, and a user may interact with display 160 to input the desired cooking parameters for each cooking chamber 232.

Notably, oven appliance 100 may further include sensors or detection assemblies for determining the cooking configuration or configured zones of cooking chambers 232. Moreover, the sensors may automatically detect the presence of vertical dividers 230 without user intervention and may prompt a user to input target recipes for each particular chamber based on the cooking configuration. In this regard, for example, oven appliance 100 may include a sensor assembly 260 that is generally configured for detecting the one or more vertical dividers 230. Controller 166 may use sensor assembly 260 to detect dividers 230 and determine the one or more configured cooking zones.

Figure 7:
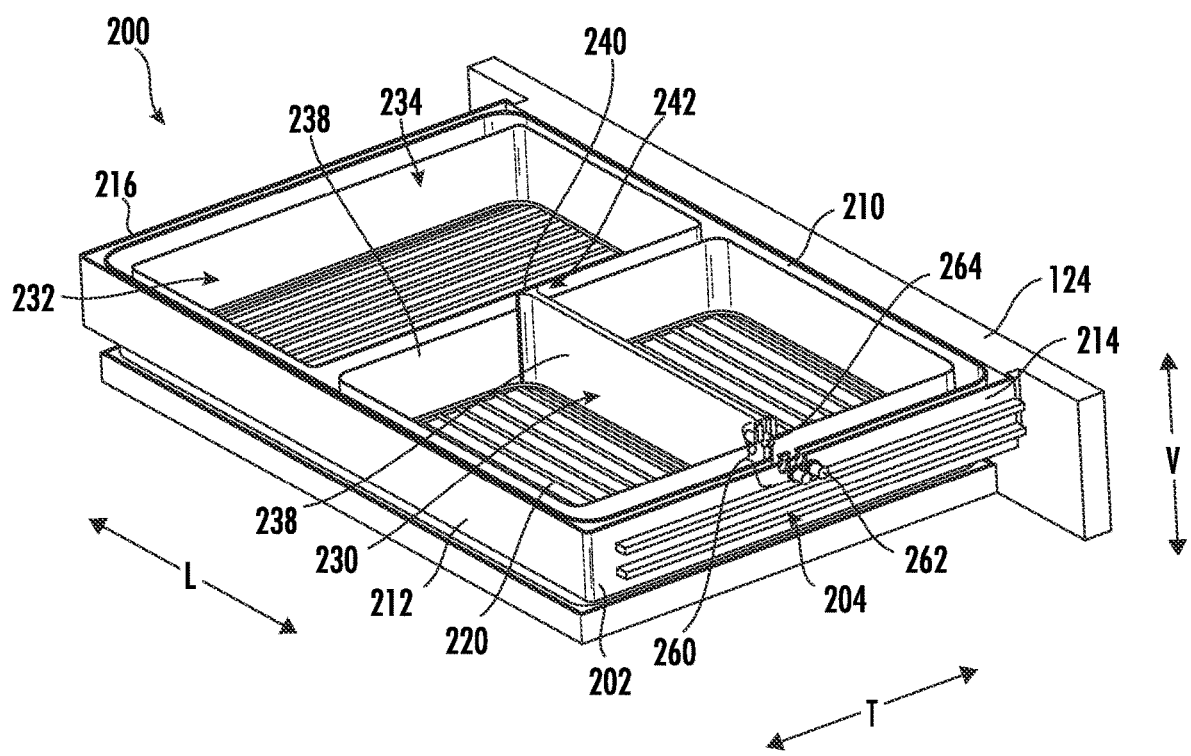
FIG. 7 is a top, perspective, cross-sectional view of the exemplary drawer assembly of FIG. 2 according to an exemplary embodiment of the present subject matter.
Figure 8:
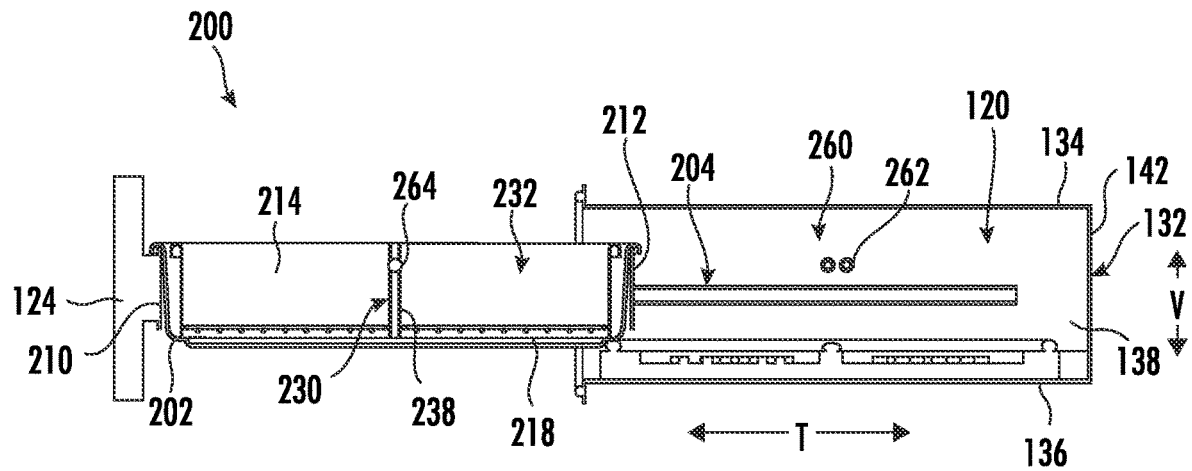
FIG. 8 is a side, cross-sectional view of the exemplary drawer assembly of FIG. 2 according to an exemplary embodiment of the present subject matter.
Figure 9:
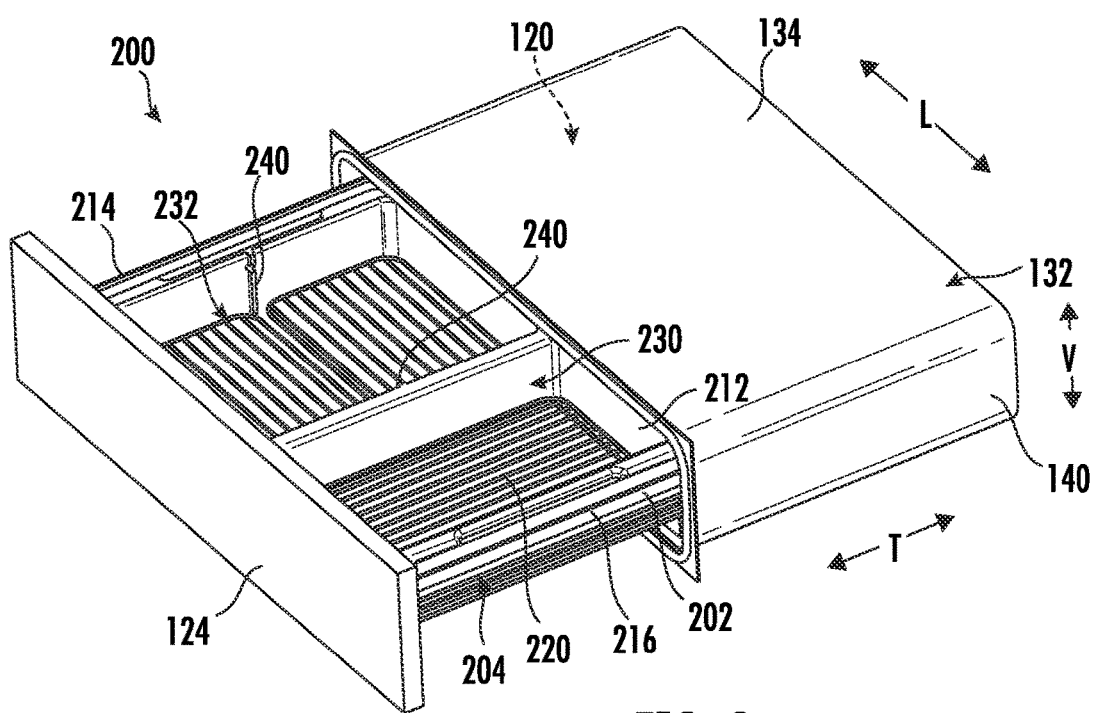
FIG. 9 is a perspective view of the exemplary drawer assembly of FIG. 2 with one of the vertical dividers removed according to an exemplary embodiment of the present subject matter.

Specifically, as best illustrated in FIG. 7, sensors 260 may include a divider sensor 262 that is fixed relative to either drawer frame 202 or upper cooking chamber 120. In addition, a divider trigger 264 may be positioned on each of the one or more vertical dividers 230. In general, divider trigger 264 may be any suitable device or mechanism for triggering or otherwise being detectable by divider sensor 262 when vertical dividers 230 are installed in drawer frame 202. In this regard, for example, sensor assembly 260, divider sensor 262, and divider trigger 264 may generally include at least one of a reed switch, a mechanical trigger, an optical sensor, a magnet, a hall effect sensor, a capacitive sensor, a resistive sensor, an inductive sensor, or any other suitable sensing device or mechanism. It should be appreciated that divider sensor 262 and divider trigger 264 may be swapped while remaining within the scope of the present subject matter.

Aspects of the present subject matter are generally directed to an oven drawer with user configurable horizontally divided cavities. In specific, oven drawer can be divided into smaller cavities by using user removable vertical dividers which are positioned to divide the horizontal space, such that each cavity can be operated either independently (unlike zones within an undivided cavity) or the cavities can be combined into a single cavity. When the drawer is closed, the divider, the cavity top and drawer bottom may define at least two cavities that are insulated to limit thermal communication with each other. The dividers may be simple steel dividers of double wall type or may be constructed with rigid or encapsulated insulating dividers of any suitable material to reduce an interaction or thermal communication between cavities. Moreover, upper and lower gaskets may be positioned within the cooking chamber to reduce heat leakage between cavities, e.g., when a divider is present.

The drawer includes a pair of upper and lower heaters for each corresponding cavity established by the divider and oven drawer, where each heater of the upper and lower heating assemblies is independently controllable. Each cavity may have the relative upper and bottom heating adjusted independently from an adjacent cavity. By contrast, with the dividers removed, the oven drawer may be operated as a single cavity with all heater pairs operated either simultaneously or sequentially to evenly heat the entire drawer cavity. The oven drawer may also include a temperature sensing assembly that includes a plurality of temperature sensors for independently monitoring the temperatures within the one or more configured cavities.

A controller may be configured to receive a recipe, including but not limited to, a cooking mode (bake, broil, etc.), a temperature setting, and a duration for each cavity for a given cavity configuration. The cavity configuration may be detected by a sensor assembly that is used to sense the presence of one or more dividers, such that the user interface automatically configures for appropriate input of the given cavity configuration. The sensors may be of the electrical type such as optical, capacitive, or inductive sensors. They may be mechanical such as switches and pogo pins.

In the examples shown, a ceramic glass drawer bottom is used to allow a relatively free passage of radiant heat of each bottom heater through the bottom into the respective cavity while minimizing a thermal conduction and communication between adjacent cavities. An oven rack may be provided for each cavity configuration to allow hot air to circulate around cookware within a given cavity.

Aspects of the present subject matter overcome various drawbacks of existing dividable ovens and facilitates the division of an oven cavity further into more than just two halves more efficiently and effectively than the horizontally divided ovens. For example, a horizontal cavity array is less susceptible to thermal influence from adjacent cavities, and the loss of an upper or lower heat source inherent in a horizontal divider is eliminated with the new solution. Unlike zonal efforts, because the cavities in this solution are divided, a heating between cavities may be negligible compared to single cavity solutions that manage heat within zones. Thus, a user may control the heating of each cavity without zonal interdependence or interactions. The foods cooked within differing cavities may be substantially different in recipe. Another advantage is that a single cavity from a horizontal cavity array may be utilized to cook a smaller food load faster and with less heat loss than a cavity divided along a vertical direction where all cavities share a maximum area (e.g., a full-sized footprint).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
    a cooking chamber positioned within a cabinet;
    a heating assembly comprising a plurality of upper heating elements positioned proximate a top of the cooking chamber and a plurality of lower heating elements positioned proximate a bottom of the cooking chamber to define a plurality of heating zones; and
    a drawer assembly slidably positioned within the cooking chamber, the drawer assembly comprising:
        a drawer frame slidably mounted to sidewalls of the cooking chamber and being movable between an open position and a closed position;
        a horizontal rack mounted proximate a bottom of the drawer frame;
        one or more vertical dividers positionable within the drawer frame to define a plurality of cooking chambers, each of the plurality of cooking chambers being aligned with one or more of the plurality of heating zones; and
        a sensor assembly for detecting the one or more vertical dividers, the sensor assembly comprising a divider sensor fixed relative to the drawer frame, and wherein one or more configured zones of the cooking chamber are detected using the sensor assembly.

2. The oven appliance of claim 1, further comprising a controller operably coupled to the heating assembly and being configured to:
    determine that the one or more vertical dividers have been removed from the drawer assembly; and
    operate the heating assembly to regulate heating of all the plurality of cooking chambers in unison.

3. The oven appliance of claim 1, wherein the one or more vertical dividers are removable to define the one or more configured zones of the plurality of cooking chambers, the oven appliance further comprising a controller operably coupled to the heating assembly and being configured to:
    detect the one or more configured zones of the plurality of cooking chambers; and
    operate the heating assembly to independently regulate heating of the configured zones.

4. The oven appliance of claim 3, further comprising a user interface panel, wherein the controller is operably coupled to the user interface panel and is configured to:
    provide a visual display of the one or more configured zones on the user interface panel; and
    detect user interaction with the visual display to input a cooking recipe for each of the one or more configured zones.

5. The oven appliance of claim 1, wherein the sensor assembly comprises:
    a divider trigger positioned on each of the one or more vertical dividers, wherein the divider trigger is detectable by the divider sensor when installed in the drawer frame.

6. The oven appliance of claim 1, wherein each sensor assembly comprises at least one of a reed switch, a mechanical trigger, an optical sensor, a magnet, a hall effect sensor, a resistive sensor, a capacitive sensor, or an inductive sensor.

7. The oven appliance of claim 1, wherein each of the one or more vertical dividers are removable.

8. The oven appliance of claim 1, wherein each of the one or more vertical dividers include a thermally insulated panel.

9. The oven appliance of claim 1, wherein the one or more vertical dividers comprise:
    a transverse divider that extends along the transverse direction from a front wall to a back wall of the drawer frame; and
    a lateral divider that extends along the lateral direction from a sidewall of the drawer frame to the transverse divider.

10. The oven appliance of claim 1, wherein the one or more vertical dividers comprise:
    a lateral divider that extends along the lateral direction from a left side to a right side of the drawer frame; and
    a transverse divider that extends along the transverse direction from a front or rear wall of drawer frame to the lateral divider.

11. The oven appliance of claim 1, further comprising:
    a plurality of gaskets positioned on at least one of a top wall or a bottom wall of the cooking chamber for sealing against the one or more vertical dividers when installed.

12. The oven appliance of claim 1, further comprising a plurality of temperature sensors, each of the plurality of temperature sensors being aligned with one zone of the plurality of heating zones.

13. The oven appliance of claim 1, wherein the drawer assembly further comprises:

a glass panel positioned proximate a bottom of the drawer frame below the horizontal rack.

14. A drawer assembly for an oven appliance, the oven appliance comprising a cooking chamber positioned within a cabinet and a heating assembly defining a plurality of heating zones, the drawer assembly comprising:
- a drawer frame slidably mounted to sidewalls of the cooking chamber and being movable between an open position and a closed position;
- a horizontal rack mounted proximate a bottom of the drawer frame;
- one or more vertical dividers positionable within the drawer frame to define a plurality of cooking chambers, each of the plurality of cooking chambers being aligned with one or more of the plurality of heating zones; and
- a sensor assembly for detecting the one or more vertical dividers, the sensor assembly comprising a divider sensor fixed relative to the drawer frame, and wherein one or more configured zones of the cooking chamber are detected using the sensor assembly.

15. The drawer assembly of claim 14, the oven appliance further comprising a controller operably coupled to the heating assembly and being configured to:
- determine that the one or more vertical dividers have been removed from the drawer assembly; and
- operate the heating assembly to regulate heating of all the plurality of cooking chambers in unison.

16. The drawer assembly of claim 14, wherein the one or more vertical dividers are removable to define the one or more configured zones of the plurality of cooking chambers, the oven appliance further comprising a controller operably coupled to the heating assembly and being configured to:
- detect the one or more configured zones of the plurality of cooking chambers; and
- operate the heating assembly to independently regulate heating of the configured zones.

17. The drawer assembly of claim 16, the oven appliance further comprising a user interface panel, wherein the controller is operably coupled to the user interface panel and is configured to:
- provide a visual display of the one or more configured zones on the user interface panel; and
- detect user interaction with the visual display to input a cooking recipe for each of the one or more configured zones.

18. The drawer assembly of claim 14, wherein each of the one or more vertical dividers are removable, thermally insulated panels.

* * * * *